United States Patent
Stefanidis et al.

(10) Patent No.: US 11,042,401 B2
(45) Date of Patent: *Jun. 22, 2021

(54) SYSTEM TO PROTECT CRITICAL REMOTELY ACCESSIBLE MEDIA DEVICES

(71) Applicant: Disney Enterprises, Inc., Burbank, CA (US)

(72) Inventors: Efthimis Stefanidis, Douglaston, NY (US); Michael J. Strein, Bohemia, NY (US); Craig L. Beardsley, Chicago, IL (US); Vladislav Feldman, Manhasset Hills, NY (US)

(73) Assignee: Disney Enterprises, Inc., Burbank, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/173,907

(22) Filed: Oct. 29, 2018

(65) Prior Publication Data

US 2020/0133715 A1    Apr. 30, 2020

(51) Int. Cl.

| G06F 21/56 | (2013.01) |
| G06F 21/50 | (2013.01) |
| G06F 21/57 | (2013.01) |
| G06F 8/65 | (2018.01) |
| G06F 8/61 | (2018.01) |
| G06F 9/48 | (2006.01) |
| H04L 29/06 | (2006.01) |

(52) U.S. Cl.
CPC ............ *G06F 9/4843* (2013.01); *G06F 21/50* (2013.01); *G06F 21/562* (2013.01); *H04L 63/145* (2013.01); *H04L 63/1433* (2013.01); *G06F 8/61* (2013.01); *G06F 8/65* (2013.01); *G06F 21/577* (2013.01)

(58) Field of Classification Search
CPC ...... G06F 9/4843; G06F 21/50; G06F 21/562; G06F 8/61; G06F 8/65; G06F 21/577; G06F 2221/03; G06F 21/57; G06F 9/547; G06F 21/00; G06F 21/56; H04L 63/1433; H04L 63/145; H04L 63/1408
See application file for complete search history.

(56) References Cited

U.S. PATENT DOCUMENTS

| 8,370,943 | B1 * | 2/2013 | Dongre | G06F 11/3006 |
| | | | | 726/22 |
| 9,052,904 | B1 * | 6/2015 | Cooley | G06F 1/329 |
| 9,306,814 | B1 * | 4/2016 | Roth | H04L 47/76 |
| 9,866,585 | B2 * | 1/2018 | Grupe | G06F 21/562 |
| 2008/0279112 | A1 * | 11/2008 | Schryer | H04L 12/2809 |
| | | | | 370/252 |

* cited by examiner

*Primary Examiner* — Jung W Kim
*Assistant Examiner* — Howard H. Louie
(74) *Attorney, Agent, or Firm* — Patterson + Sheridan, LLP (57) ABSTRACT

Techniques for controlling the performance of remote operations on computing devices within a video processing environment are described. One embodiment determines to perform a remote operation on a remote device in a media processing environment and determines a signal chain within the media processing environment that includes the remote device. An operational status of the signal chain is determined, based on a media processing schedule for the signal chain. Upon determining that the operational status indicates that the remote device is available for performance of the remote operation, embodiments initiate the performance of the remote operation on the remote device.

15 Claims, 5 Drawing Sheets

SYSTEM TO PROTECT CRITICAL REMOTELY ACCESSIBLE MEDIA DEVICES

FIELD OF THE INVENTION

The present disclosure relates to computer system security, and more specifically, to techniques for managing security scans of computer systems in media environments.

DESCRIPTION OF THE RELATED ART

Today, a significant and ever-increasing amount of data and control operations are stored on and managed by computing systems. As a result, computer security is more important than ever before, as the consequences of a security breach can be dire. In media environments specifically, many operations that were previously performed manually by users (e.g., with the help of analog and/or limited digital technology) are now performed by computing systems, potentially in an automated fashion or with human oversight. As additional responsibilities and capabilities are granted to such computing systems, the consequences of any security breach in such computing systems become increasingly dire.

SUMMARY

One embodiment provides a method that includes determining to perform a remote operation on a remote device in a media processing environment. The method includes determining a signal chain within the media processing environment that includes the remote device. The method also includes determining an operational status of the signal chain, based on a media processing schedule for the signal chain. Additionally, the method includes, upon determining that the operational status indicates that the remote device is available for performance of the remote operation, initiating the performance of the remote operation on the remote device.

Another embodiment provides a system that includes one or more computer processors and a memory containing computer program code that, when executed by operation of one or more computer processors, performs an operation. The operation includes determining to perform a remote operation on a remote device in a media processing environment. The operation also includes determining a signal chain within the media processing environment that includes the remote device. Additionally, the operation includes determining an operational status of the signal chain, based on a media processing schedule for the signal chain. The operation further includes, upon determining that the operational status indicates that the remote device is available for performance of the remote operation, initiating the performance of the remote operation on the remote device.

Yet another embodiment provides a non-transitory computer-readable medium containing computer program code that, when executed by operation of one or more computer processors, performs an operation. The operation includes determining to perform a remote operation on a remote device in a media processing environment. The operation also includes determining a signal chain within the media processing environment that includes the remote device. Additionally, the operation includes determining an operational status of the signal chain, based on a media processing schedule for the signal chain. The operation further includes, upon determining that the operational status indicates that the remote device is available for performance of the remote operation, initiating the performance of the remote operation on the remote device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Today, it is common for remote operations to be performed on remote computing systems. Such remote operations can include software updates, maintenance operations (e.g., storing a backup copy of a database), security scans, and so on. Security scanning generally refers a technique for identifying security vulnerabilities in a computing system. For example, a security scanning computing system can be configured with computer logic to perform a series of tests on remote computing systems to identify whether the remote computing systems have any known vulnerabilities. Such tests could include, without limitation, scanning for ports exposed by the remote computing system, transmitting malformed data or sequences of data to the exposed ports, attempting a sequence of calls to an exposed Application Programming Interface (API) of an application executing on the remote computing system, and so on. In each of these scenarios, the security scanning computing system can evaluate data received from the remote computing system to determine whether the security vulnerability exists and/or was exploited by the test in question.

For example, if a particular version of an application suffers from a bug where a particular sequence of API calls that include malformed data results in the caller gaining root access in the application, logic on the security scanning computing system can evaluate data received from the remote system to determine whether root access was gained responsive to issuing the particular sequence of API calls including the malformed data (in this example, performing a test to check whether the remote system has the vulnerability in question).

If an administrator determines (e.g., using a security scanning computing system, based on receiving a vulnerability bulletin, etc.) that a vulnerability exists, the security administrator could perform one or more operations to address the vulnerability. For example, the administrator could update the version of the application on the remote computing system to a version that does not suffer from the vulnerability, the administrator could limit access to the application until a new version can be released, and so on. However, such updates and other operations can consume a significant amount of computational resources on the remote systems being updated.

Today, many organizations are deploying their applications within cloud computing environments and/or remote data centers, as such environment can provide a number of benefits over traditional on-site servers. For example, such environments are commonly equipped with proper ventilation and cooling systems to maintain proper environmental conditions for computing systems, and are staffed with qualified, specialized personnel for quickly handling any issues that may occur with the computing system hardware. Moreover, such environments may be able to react much more dynamically to scaling the size of a given deployment up or down, and may do so with a more favorable pricing structure relative to conventional onsite deployments.

One challenge for media environments that choose to deploy applications in such cloud computing environments and in remote data centers is that many media applications are already very demanding on their computational resources. Moreover, many such media applications are tasked with processing video content in real-time, any interruptions to the video processing can directly and dramatically affect the user experience of viewers of the video content.

While computer security is a critical issue in such media environments, a security scanning application initiating a security scan can consume a significant amount of computational resources on the computing system being scanned, as the computing system may receive a barrage of requests, API calls and so on within a short window of time as a result of the security scan. If the security scanning computing system initiates a security scan of a computing system that is executing a media application processing video content in real-time, this additional computational load can tax the computing system to the point that the performance of the media application is affected, resulting in a direct and potentially dramatic negative effect on the user experience of viewers of the video content in question.

As such, embodiments described herein provide techniques for determining the operational status of a remote device in a media processing environment and scheduling the performance of a remote operation when the remote device is available. In one embodiment, the remote device is considered "unavailable" for the performance of a remote operation when the remote device or another computing device within the signal chain of the remote device is performing a media processing operation.

Once embodiments determine to perform a remote operation on a remote device in a media processing environment, embodiments can determine a signal chain within the media processing environment that includes the remote device. Generally, a signal chain refers to a grouping of computing devices (e.g., computing systems, file systems, network devices, firewalls, etc.) that together perform a workflow for executing a media processing operation (e.g., transcoding video content). For example, a signal chain could include a file server that stores source video content, a network device that transmits the source video content to a computing server, and a computing server that performs a transcoding operation on the source video content.

Embodiments could then determine an operational status of the signal chain, based on a media processing schedule for the signal chain. In one embodiment, the operational status of the signal chain is determined by determining whether the devices within the signal chain are available, based on the media processing schedule. Generally, for a television network, media processing schedules can be defined for various different streams, and each of these media processing schedules can be carried out by a separate signal chain of devices. For example, a given television network may have multiple streams for different time zones or for different countries.

Upon determining that the operational status indicates that the remote device is available for performance of the remote operation, embodiments can initiate the performance of the remote operation on the remote device. If embodiments determine that the remote device is unavailable, embodiments can refrain from initiating the remote operation and can schedule a timer to query the status of the remote device again at a future point in time.

Figure 1:
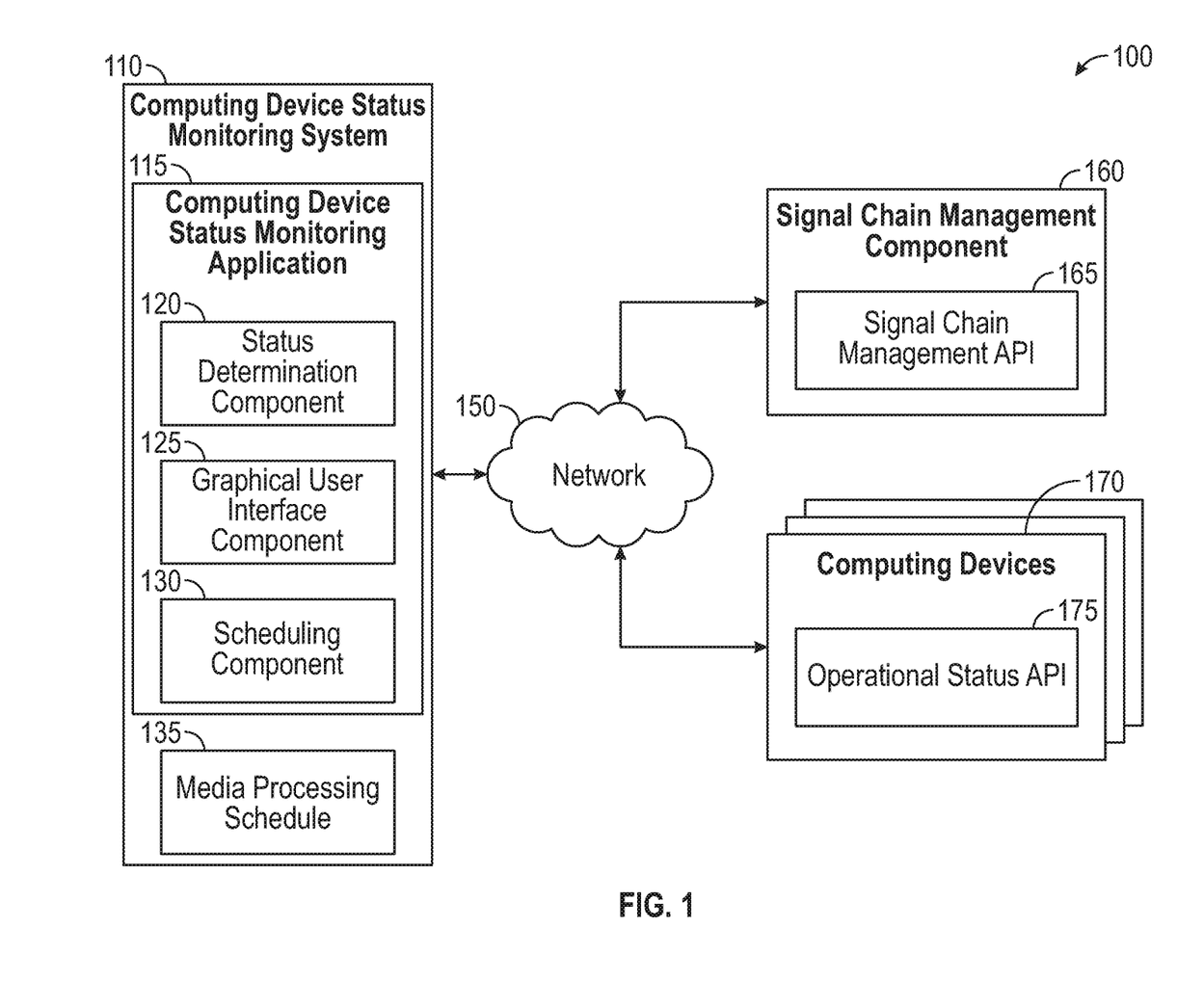
FIG. 1 is a block diagram illustrating a system configured with a computing device status monitoring application, according to one embodiment described herein.

FIG. 1 is a block diagram illustrating a system configured with a computing device status monitoring application, according to one embodiment described herein. As shown, the system 100 includes a computing device status monitoring system 110, a signal chain management component 160 and computing devices 170, interconnected via a network 150. The computing device status monitoring system 110 includes a computing device status monitoring application 115, which in turn includes a status determination component 120, a graphical user interface (GUI) component 125 and a scheduling component 130. The signal chain management component 160 includes a signal chain management API 165. The computing devices 170 include an operational status API 175, through which the current operational status of the computing devices 170 can be determined.

Generally, the computing device status monitoring system 110 is configured to determine the current operational status of one of the computing devices 170. In doing so, the computing device status monitoring system 110 can query the operational status API 175 of the computing device 170 in question, and the operational status API 175 can return a data value(s) indicating the current operational status (e.g., currently processing, idle, etc.) of the computing device 170 in question.

Additionally, the computing device status monitoring system 110 could query the signal chain management API 165 of the signal chain management component 160 to determine one or more other computing devices 170 in the same signal path as the computing device 170 in question. The computing device status monitoring application 115 could access a media processing schedule 135 to determine whether the computing device 170 in question is currently scheduled to perform a media processing operation. Additionally, the computing device status monitoring application 115 could access the media processing schedule 135 to determine whether any of the one or more other computing devices 170 in the signal chain of the computing device 170 in question are currently scheduled to perform a media processing operation. If the computing device 170 in question or any of the computing devices 170 in the signal chain are currently performing a media processing operation, the computing device status monitoring application 115 could determine that the computing device 170 in question is currently unavailable for the performance of remote operations (e.g., software updates, software installations, security scans, etc.).

In one embodiment, the computing device status monitoring application 115 is configured to determine not only whether any of the computing devices 170 in the signal chain (including the computing device 170 in question) are currently performing a media processing operation, but the computing device status monitoring application 115 can further determine whether any of the computing devices 170 are scheduled to begin performing a media processing operation within a predefined window of time (e.g., 30 minutes, 60 minutes, etc.). Thus, in such an embodiment, if the computing device status monitoring application 115 determines that a computing device 170 will begin performing a media processing operation in less than the predefined window of time (e.g., where the computing device 170 is scheduled, according to the media processing schedule 135, to begin performing a media processing operation in 20 minutes, and the predefined window of time is a value greater than 20 minutes), the computing device status monitoring application 115 could determine that the computing device 170 is unavailable for the performance of remote processing operations, even if the computing device 170 is not currently performing a media processing operation.

The graphical user interface component 125 is generally configured to generate a graphical user interface representing the availability of the computing devices 170 for the performance of remote processing operations. In doing so, the graphical user interface component 125 can output a depiction of the signal chain in which the computing devices 170 reside and can output an indication of the current availability (e.g., available, unavailable, etc.) of the computing devices 170 within each signal chain for the performance of remote operations.

In one embodiment, where the computing device status monitoring application 115 determines that the computing device 170 in question is not currently available for the performance of a remote operation, the scheduling component 130 can schedule a timer and upon expiration of the timer, the computing device status monitoring application 115 can then determine whether the computing device 170 in question is now available for performance of the remote operation. In one embodiment, the scheduling component 130 is configured to process the media processing schedule 135 to determine an approximate time at which the computing device 170 in question will be available. The scheduling component 130 can then set the timer to expire at or substantially at the approximate time.

Figure 2:
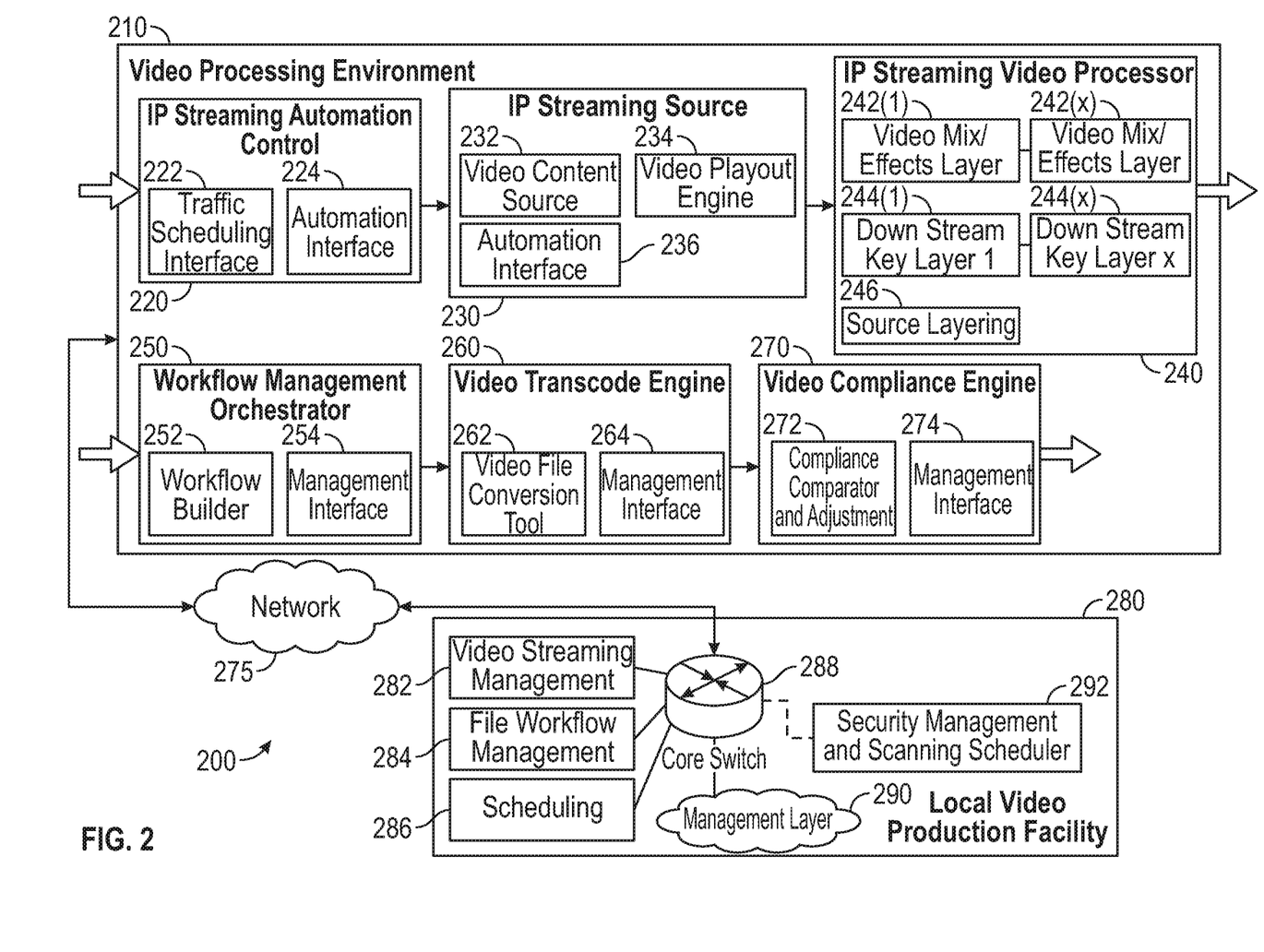
FIG. 2 is a block diagram illustrating a video processing system, according to one embodiment described herein.

FIG. 2 is a block diagram illustrating a video processing system, according to one embodiment described herein. As shown, the system 200 includes a video processing environment 210 and a local video production facility 280, connected via a network 275 (e.g., the Internet). As shown, the video processing environment 210 includes a video streaming pipeline that includes an Internet Protocol (IP) Streaming Automation control component 220, an IP Streaming Source component 230 and an IP Streaming Video Processing component 240. Additionally, the video processing environment 210 includes a video encoding pipeline that includes a Workflow Management Orchestrator component 250, a Video Transcode Engine 260 and a Video Compliance Engine 270.

The IP Streaming Automation Control component 220 is generally configured to provide Application Programming Interfaces (APIs) for initiating and controlling IP video streaming tasks. As shown, the IP Streaming Automation Control component 220 includes a Traffic Scheduling Interface 222 and an Automation Interface 224. The Traffic Scheduling Interface 222 is generally configured to provide a set of functions for controlling traffic scheduling for IP streaming of video data. The Automation Interface 224 generally provides a set of functions for automating various tasks within the video processing environment 210.

The IP Streaming Source component 230 includes a Video Content Source 232, a Video Playout Engine 234 and an Automation Interface 236. The Video Content Source 232 generally represents source video data for which video streaming services will be provided. The Video Playout Engine 234 generally manages the playback of video content (e.g., source video content, transcoded versions of the source video content, etc.) across one or more video streaming sessions. The Automation Interface 236 provides a set of functions for automating various tasks relating to the streaming of the source video content.

The IP Streaming Video Processor 240 includes Video Mix/Effects Layers 242(1)-(X), Downstream Key Layers 244(1)-(X) and a Source Layering component 246. The Video Mix/Effects Layers 242(1)-(X) generally represent a set of components that are configured to process video data being streamed in order to add one or more effects to the video stream. The Downstream Key Layers 244(1)-(X) provide a keying stage where the video stream is further processed. For example, one of the Downstream Key Layers 244(1)-(X) could be configured to overlay a graphic onto a portion of the video stream.

The video encoding pipeline that includes a Workflow Management Orchestrator component 250, which contains a workflow builder 252 and a management interface 254. The workflow builder 252 contains logic for constructing a new workflow for performing an operation relating to processing video data. The management interface 254 provides a set of functions for controlling the behavior of the Workflow Management Orchestrator component 250. For example, the management interface 254 could provide a function(s) for generating a new workflow, and the management interface 254 could make corresponding calls to the workflow builder 252 when the provided function(s) is called. The management interface 254 could further provide a function(s) for executing workflows, halting workflows, retrieving status information for workflows, and so on.

The Video Transcode Engine 260 is generally configured to perform transcoding operations on video data within the video processing environment 210. For example, a given video stream could be delivered to multiple different types of client devices, and the video stream can be transcoded into multiple different streams for the different types of client devices. For example, the source video stream could be transcoded into a first stream configured for display on mobile devices and a second stream configured for display on high-definition televisions and other displays. The Video Transcode Engine 260 includes a Video File Conversion Tool 262 and a Management Interface 264. The Video File Conversion Tool 262 is generally configured to perform transcoding operations on video data. The Management Interface 264 provides a set of functions for managing the Video File Conversion Tool 262. For example, the Management Interface 264 could provide functions for initiating a new transcoding operation, retrieving status information on an executing transcoding operation, halting an executing transcoding operation, and so on.

The Video Compliance Engine 270 generally ensures that transcoded video files comply with one or more broadcast video requirements. The Video Compliance Engine 270 includes a Compliance Comparator and Adjustor component 272 and a Management Interface 274. Generally, the Compliance Comparator and Adjustor component 272 is configured to identify when a given video file does not comply with one of the one or more broadcast video requirements. In one embodiment, in response to identifying that the video file does not comply with the broadcast video requirement, the Compliance Comparator and Adjustor component 272 is further configured to perform one or more processing operations on the video file to ensure compliance with the broadcast video requirement. In one embodiment, the Compliance Comparator and Adjustor component 272 can generate a notification upon determining that a video file does not comply with one or more requirements. A user, via a client device, could query the Management Interface 274 to retrieve the notification and could access an exposed function of the Management Interface 274 to instruct the Compliance Comparator and Adjustor component 272 to perform one or more processing operations on the video file.

The Local Video Production Facility 280 includes a Video Streaming Management component 282, a File Workflow Management component 284, and a Scheduling component 286, a Management layer 290, and a Security Management and Scanning Scheduler component 292, interconnected via a switch 288. Generally, the Video Streaming management component 282 can interact with the IP Streaming Automation Control component 220, IP Streaming Source component 230 and IP Streaming Video Processor 240 to manage video streaming sessions for produced video content. The File Workflow management component 284 can manage video files and related files produced at the Local Video Production Facility 280 and can also interact with the Workflow Management Orchestrator 250, the Video Transcode Engine 260 and the Video Compliance Engine 270 to manage transcoding operations and workflows for produced video content. The Security Management and Scanning Scheduler component 292 is generally configured to perform one or more security scans on computing systems and devices within the video processing environment 210. In one embodiment, the Security Management and Scanning Scheduler component 292 is configured with a computing device status monitoring application 115 that is configured to monitor the status of the computing systems and devices within the video processing environment 210, and to initiate security scans when the computing systems and devices (and their associated signal chain) is not performing a video processing operation (or scheduled to perform a video processing operation in the near future).

Figure 3:
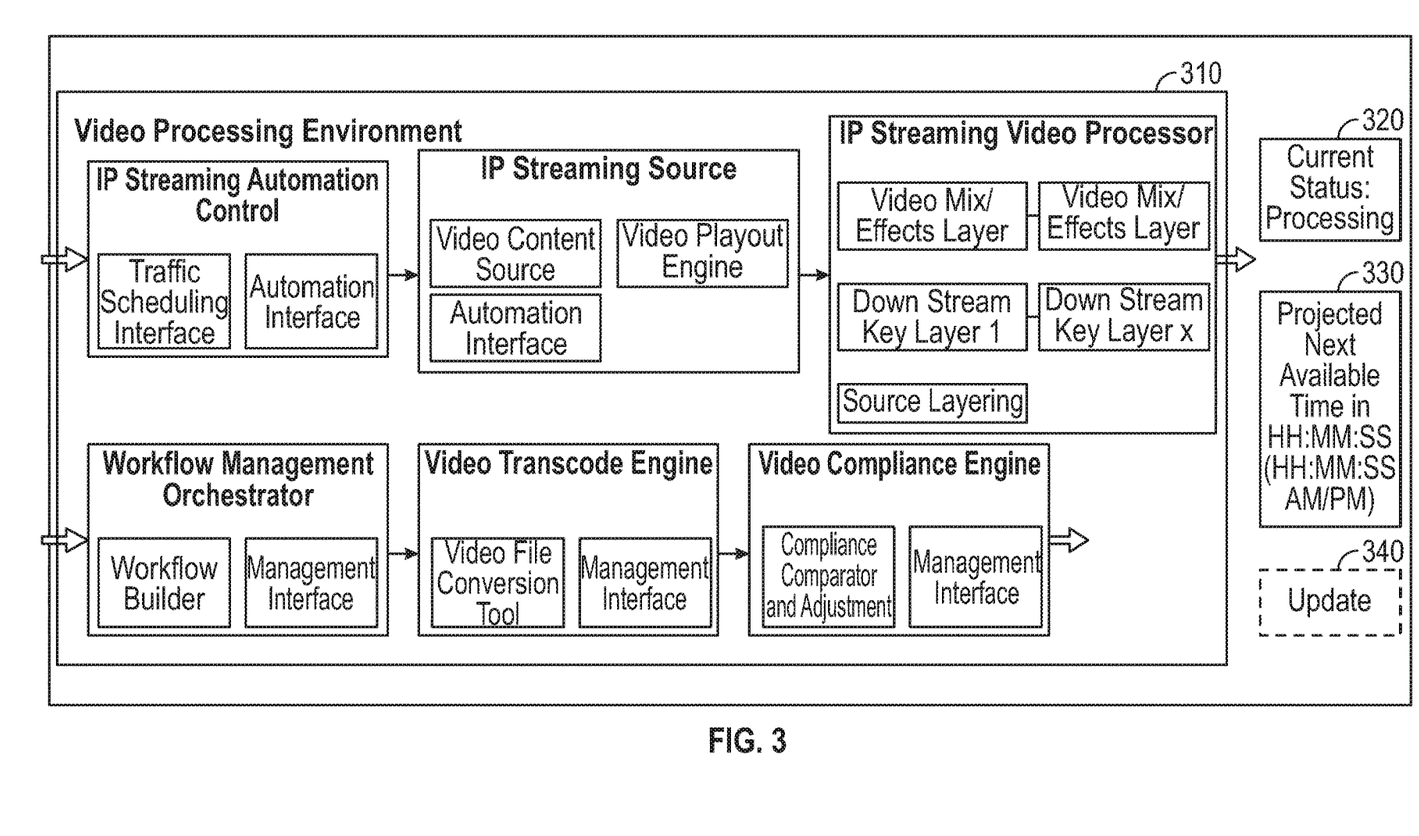
FIG. 3 illustrates a graphical user interface for a computing device status monitoring application, according to one embodiment described herein.

FIG. 3 illustrates a graphical user interface for a computing device status monitoring application, according to one embodiment described herein. As shown, the graphical user interface 300 includes a visual depiction of a topology of a signal chain 305, a current status indicator 310 for the signal chain, a projected availability indicator 320 for the signal chain 305, and an automated update button 330. In the depicted embodiment, the current status indicator 310 indicates that the signal chain 305 is currently "Processing", indicating that devices within the signal chain are currently performing a media processing operation and are unavailable for the performance of remote operations such as software updates, security scans, and so on.

The projected availability indicator 320 of the graphical user interface 300 shows an estimated amount of time until the signal chain 305 will complete the media processing operation or otherwise be available. Of note, as discussed above, in some instances the signal chain 305 may be unavailable at a particular point in time, even though the devices within the signal chain 305 may not be currently performing any media processing operations, as the computing device status monitoring application 115 can be configured to enforce a minimum amount of time for performing the remote operation. For example, the computing device status monitoring application 115 could be configured to enforce a minimum amount of time of 1 hour that a signal chain 305 needs to be free before the computing device status monitoring application 115 determines the remote device is available. In such an example, if the computing device status monitoring application 115 determines that the signal chain is currently not performing any media processing operations, but is scheduled to begin a media processing operation in 30 minutes, the computing device status monitoring application 115 could determine that the remote devices in the signal chain are not currently available for the performance of remote operations because the devices will not be available for the next hour.

In the depicted embodiment, the computing device status monitoring application 115 has determined that the remote device is not currently available, as at least one device in the signal chain 305 that includes the remote device is performing a media processing operation (or will be in the near future). As such, the computing device status monitoring application 115 has disabled the update button 330, such that any user interactions (e.g., mouse clicks) with the update button 330 will not produce an action. Once the computing device status monitoring application 115 determines that the signal chain 305 of the remote device is available for remote processing operations, the GUI component 125 of the computing device status monitoring application 115 can enable the update button 330, such that any user interactions (e.g., mouse clicks) with the enabled update button 330 will cause the computing device status monitoring application 115 to initiate an update operation for the remote device (e.g., by executing a script containing computer program code to perform the update operation on the remote device).

Figure 4:
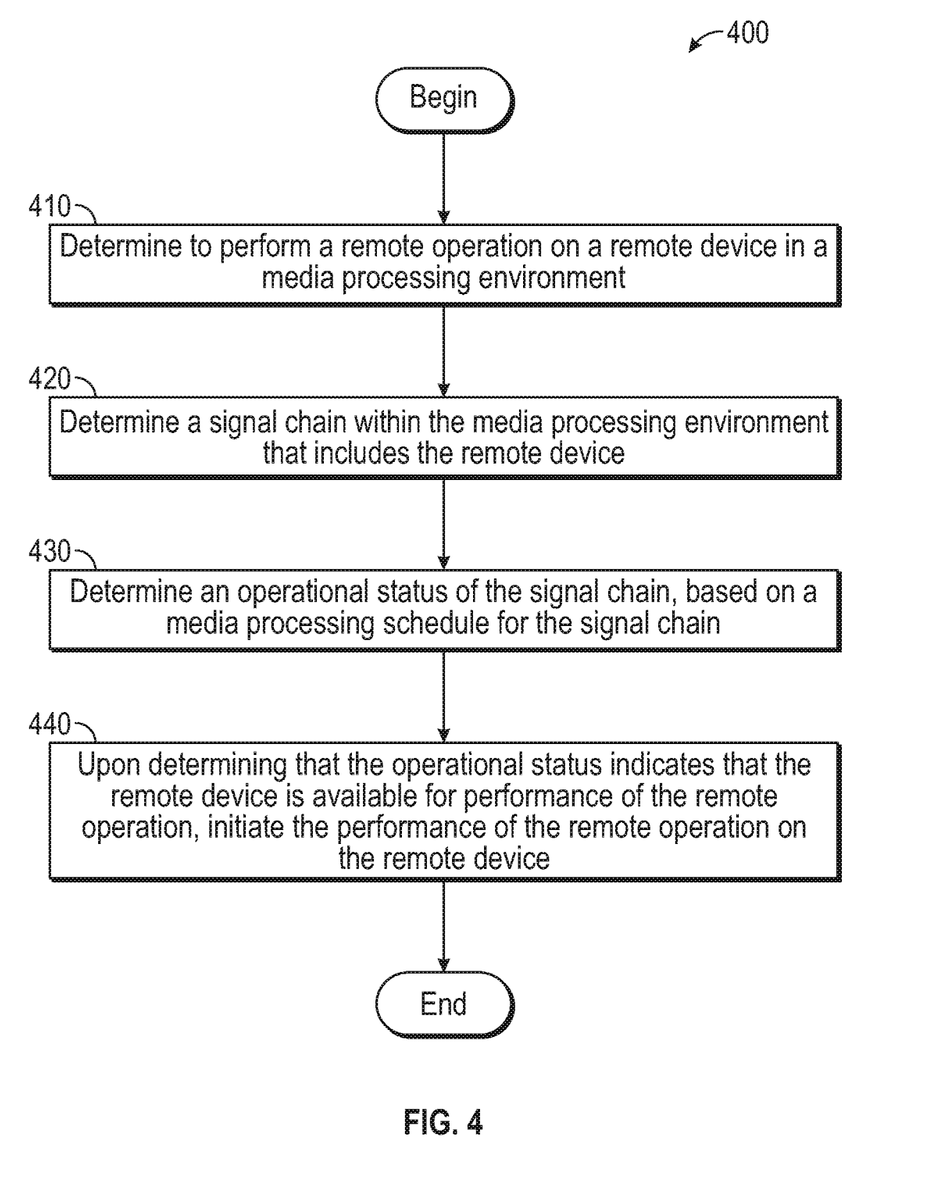
FIG. 4 is a flow diagram, illustrating a method for initiating performance of a remote operation on a remote computing device within a media processing environment, according to one embodiment described herein.

FIG. 4 is a flow diagram, illustrating a method for initiating performance of a remote operation on a remote computing device within a media processing environment, according to one embodiment described herein. The method 400 begins at block 410, where the computing device status monitoring application 155 determines to perform a remote operation on a remote device in a media processing environment. The computing device status monitoring application 155 then determines a signal chain within the media processing environment that includes the remote device (block 420). For example, the computing device status monitoring application 155 could query the signal chain management API 165 of the signal chain management component 160 to determine which defined signal chain includes the remote device.

The computing device status monitoring application 155 determines an operational status of the signal chain, based on a media processing schedule for the signal chain (block 430). For example, the computing device status monitoring application 155 could analyze the media processing schedule to determine whether the remote device is currently performing a processing operation or whether the remote device is scheduled to begin performance of a processing operation within a predefined window of time. Upon determining that the operational status indicates that the remote device is available for performance of the remote operation, the computing device status monitoring application 155 initiates the performance of the remote operation on the remote device (block 440), and the method 400 ends.

Figure 5:
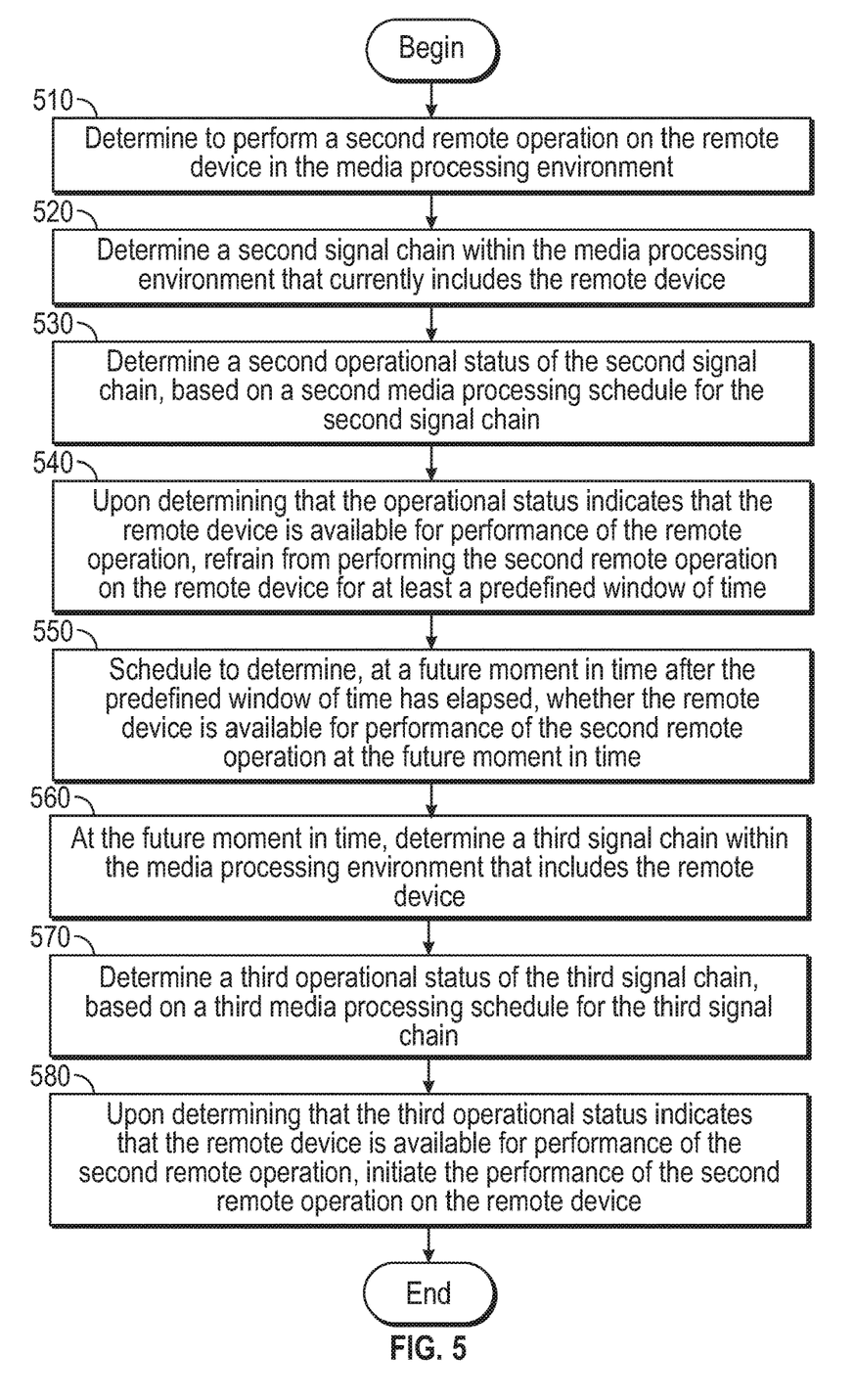
FIG. 5 is a flow diagram illustrating a method for rescheduling performance of a remote operation on a remote device, according to one embodiment descried herein.

FIG. 5 is a flow diagram illustrating a method for rescheduling performance of a remote operation on a remote device, according to one embodiment descried herein. As shown, the method 500 begins at block 510, where the computing device status monitoring application 155 determines to perform a second remote operation on the remote device in the media processing environment. The computing device status monitoring application 155 determines a second signal chain within the media processing environment that currently includes the remote device (block 520).

In the depicted embodiment, the computing device status monitoring application 155 determines a second operational status of the second signal chain, based on a second media processing schedule for the second signal chain (block 530). Upon determining that the operational status indicates that the remote device is available for performance of the remote operation, the computing device status monitoring application 155 refrains from performing the second remote operation on the remote device for at least a predefined window of time (block 540). The computing device status monitoring application 155 schedules to determine, at a future moment in time after the predefined window of time has elapsed, whether the remote device is available for performance of the second remote operation at the future moment in time (block 550).

At the future moment in time, the computing device status monitoring application 155 determines a third signal chain within the media processing environment that includes the remote device (block 560). The computing device status monitoring application 155 determines a third operational status of the third signal chain, based on a third media processing schedule for the third signal chain (block 570). The computing device status monitoring application 155 then, upon determining that the third operational status indicates that the remote device is available for performance of the second remote operation, initiates the performance of the second remote operation on the remote device (block 580), and the method 500 ends.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the computing device status monitoring application 115) or related data available in the cloud. For example, the computing device status monitoring application 115 could execute on a computing system in the cloud and could collect status information on computing devices executing with a media processing environment. In such a case, the computing device status monitoring application 115 could determine a signal chain that includes a computing device of interest and can determine a current operational status of the signal chain, based on a media processing schedule for the signal chain. The computing device status monitoring application 115 could then perform one or more operations based on the determined operational status. For example, if the computing device status monitoring application 115 determines the computing device of interest is within a current active signal chain, the computing device status monitoring application 115 could refrain from the performance of one or more processing operations on the computing device until the signal chain is no longer active. As another example, the computing device status monitoring application 115 could update a GUI to depict the current operational status of the computing device. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of using application programming interfaces (APIs) to manage remote operations in a media processing environment, the computer-implemented method comprising:

determining to perform a remote operation to install, update, or maintain software on a remote device in the media processing environment;

determining, using a signal chain management API over a data communications network, a first signal chain within the media processing environment, the first signal chain comprising a plurality of remote devices that includes the remote device;

determining, using an operational status API of each of the plurality of remote devices of the first signal chain over the data communications network, that at least one remote device is currently performing, or is scheduled to perform, a media processing operation within a first window of time;

scheduling to determine, after the first window of time has elapsed and using the signal chain management API, a second signal chain comprising a plurality of remote devices that includes the remote device; and determining, using an operational status API of each of the plurality of remote devices of the second signal chain, that each of the plurality of remote devices of the second signal chain is not currently performing, and is not scheduled to perform, any media processing operation within a second window of time; and initiating, by operation of one or more computer processors, performance of the remote operation to install, update, or maintain software on the remote device.

2. The computer-implemented method of claim 1, further comprising:

depicting an operational status of the first signal chain on a graphical user interface (GUI).

3. The computer-implemented method of claim 2, wherein the GUI further depicts the first signal chain.

4. The computer-implemented method of claim 1, wherein the remote operation comprises a first remote operation, wherein the computer-implemented method further comprises:

determining to perform a second remote operation to install, update, or maintain software on the remote device in the media processing environment;

determining, using the signal chain management API, a third signal chain comprising a plurality of remote devices that includes the remote device;

determining, using an operational status API of each of the plurality of remote devices of the third signal chain, that each of the plurality of remote devices of the third signal chain is not currently performing, and is not scheduled to perform, any media processing operation within a third window of time; and initiating performance of the second remote operation to install, update, or maintain software on the remote device.

5. A system for using application programming interfaces (APIs) to manage remote operations in a media processing environment, the system comprising:

one or more computer processors; and a memory containing computer program code that, when executed by operation of the one or more computer processors, performs an operation comprising:

determining to perform a remote operation to install, update, or maintain software on a remote device in the media processing environment;

determining, using a signal chain management API over a data communications network, a first signal chain within the media processing environment, the first signal chain comprising a plurality of remote devices that includes the remote device;

determining, using an operational status API of each of the plurality of remote devices of the first signal chain over the data communications network, that at least one remote device is currently performing, or is scheduled to perform, a media processing operation within a first window of time;

scheduling to determine, after the first window of time has elapsed and using the signal chain management API, a second signal chain comprising a plurality of remote devices that includes the remote device; and determining, using an operational status API of each of the plurality of remote devices of the second signal chain, that each of the plurality of remote devices of the second signal chain is not currently performing, and is not scheduled to perform, any media processing operation within a second window of time; and initiating performance of the remote operation to install, update, or maintain software on the remote device.

6. The system of claim 5, the operation further comprising:

depicting an operational status of the first signal chain on a graphical user interface (GUI).

7. The system of claim 6, wherein the GUI further depicts the first signal chain.

8. The system of claim 5, wherein the remote operation comprises a first remote operation, wherein the operation further comprises:

determining to perform a second remote operation on the remote device in the media processing environment;

determining, using the signal chain management API, a third signal chain comprising a plurality of remote devices that includes the remote device;

determining, using an operational status API of each of the plurality of remote devices of the third signal chain, that at one each of the plurality of remote devices of the third signal chain is not currently performing, and is not scheduled to perform, any media processing operation within a third window of time; and initiating performance of the second remote operation to install, update, or maintain software on the remote device.

9. A non-transitory computer-readable medium containing computer program code executable to perform an operation of using application programming interfaces (APIs) to manage remote operations in a media processing environment, the operation comprising:

determining to perform a remote operation to install, update, or maintain software on a remote device in the media processing environment;

determining, using a signal chain management API over a data communications network, a first signal chain within the media processing environment, the first signal chain comprising a plurality of remote devices that includes the remote device;

determining, using an operational status API of each of the plurality of remote devices of the first signal chain over the data communications network, that at least one remote device is currently performing, or is scheduled to perform, a media processing operation within a first window of time;

scheduling to determine, after the first window of time has elapsed and using the signal chain management API, a second signal chain comprising a plurality of remote devices that includes the remote device; and determining, using an operational status API of each of the plurality of remote devices of the second signal chain, that each of the plurality of remote devices of the second signal chain is not currently performing, and is not scheduled to perform, any media processing operation within a second window of time; and initiating, by operation of one or more computer processors when executing the computer program code, performance of the remote operation to install, update, or maintain software on the remote device.

10. The non-transitory computer-readable medium of claim 9, the operation further comprising:

depicting an operational status of the first signal chain on a graphical user interface (GUI).

11. The non-transitory computer-readable medium of claim 10, wherein the GUI further depicts the first signal chain.

12. The non-transitory computer-readable medium of claim 9, wherein the remote operation comprises a first remote operation, wherein the operation further comprises:

determining to perform a second remote operation on the remote device in the media processing environment;

determining, using the signal chain management API, a third signal chain comprising a plurality of remote devices that includes the remote device;

determining, using an operational status API of each of the plurality of remote devices of the third signal chain, that each of the plurality of remote devices of the third signal chain is not currently performing, and is not scheduled to perform, any media processing operation within a third window of time; and initiating performance of the second remote operation to install, update, or maintain software on the remote device.

13. The computer-implemented method of claim 1, wherein the performance of the remote operation to install, update, or maintain software on the remote device is remotely initiated by a computing device status monitoring application.

14. The system of claim 5, wherein the performance of the remote operation to install, update, or maintain software on the remote device is remotely initiated by a computing device status monitoring application.

15. The non-transitory computer-readable medium of claim 9, wherein the performance of the remote operation to install, update, or maintain software on the remote device is remotely initiated by a computing device status monitoring application.

\* \* \* \* \*

UNITED STATES PATENT AND TRADEMARK OFFICE
CERTIFICATE OF CORRECTION

PATENT NO. : 11,042,401 B2  
APPLICATION NO. : 16/173907  
DATED : June 22, 2021  
INVENTOR(S) : Efthimis Stefanidis et al.

Page 1 of 1

It is certified that error appears in the above-identified patent and that said Letters Patent is hereby corrected as shown below:

In the Claims

In Column 13, Line 66, in Claim 8, after "that" delete "at one".

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*